Patented Aug. 2, 1932

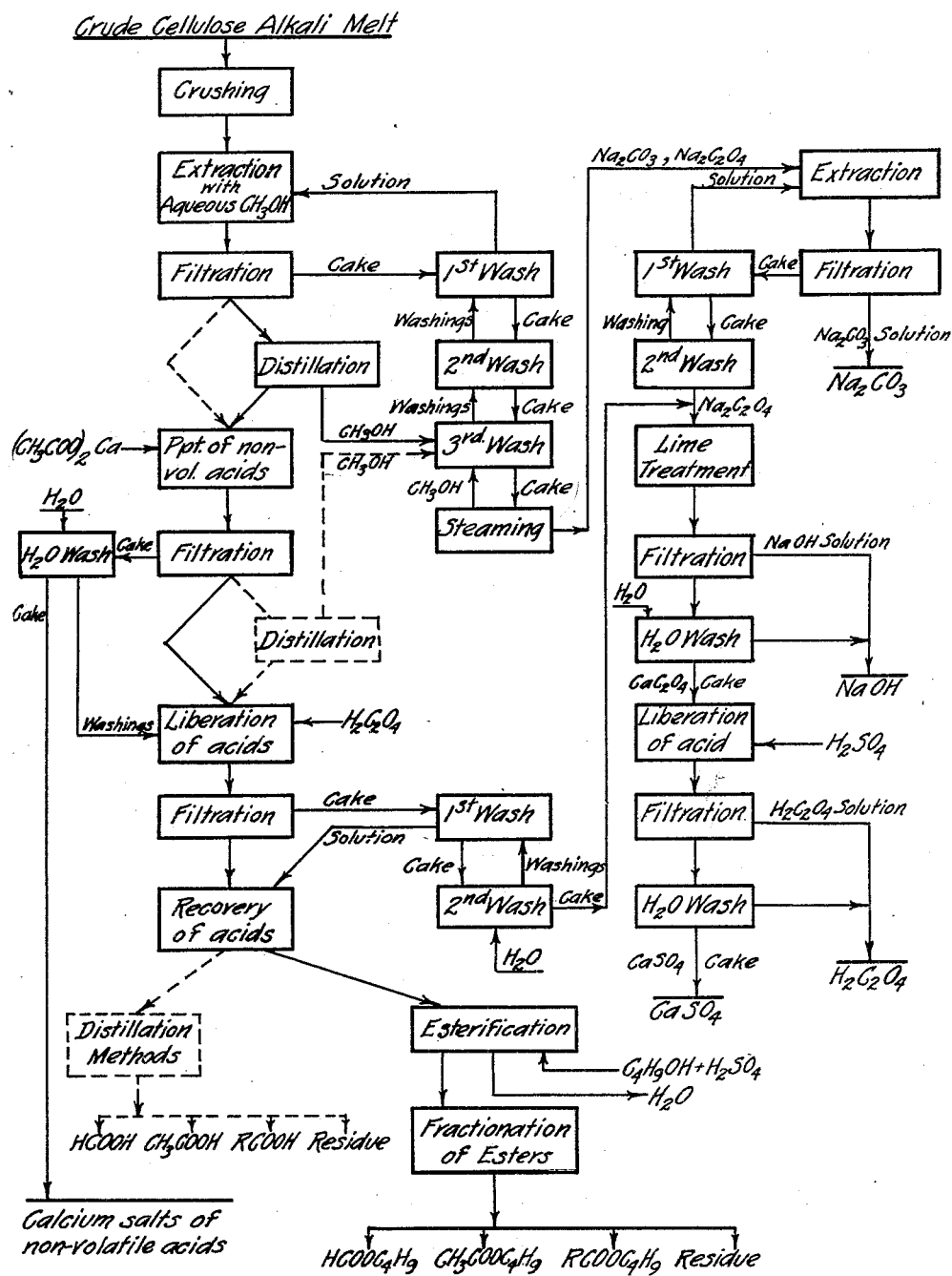

1,869,948

UNITED STATES PATENT OFFICE

LLOYD C. SWALLEN, OF TERRE HAUTE, INDIANA, ASSIGNOR TO COMMERCIAL SOLVENTS CORPORATION, OF TERRE HAUTE, INDIANA, A CORPORATION OF MARYLAND

SEPARATION AND RECOVERY OF PRODUCTS PRODUCED BY THE ALKALINE FUSION OF CELLULOSIC MATERIALS

Application filed November 24, 1928. Serial No. 321,725.

My invention relates to a process for the recovery and separation of useful products obtained by the alkaline fusion of cellulosic materials. My invention relates particularly to the process of recovering acetic, formic, oxalic, and succinic acids and other materials produced by the alkaline fusion of corncobs.

In a co-pending application, U. S. Serial No. 343,402 by William J. Bannister, filed Feb. 29, 1929, a method of producing organic acids from cellulosic materials such as corncobs is described. This process consists essentially in fusing corncob meal, or other finely divided cellulosic material, with caustic soda in the presence of a small amount of water, quickly bringing the temperature of the mixture to reaction point (160°–250° C.) and preferably holding the reaction temperature constant over a predetermined time, the heating being carried out in a closed vessel and under pressure, thus avoiding danger of too rapid dehydration of the charge and spontaneous ignition. The products formed in this reaction are the sodium salts of acetic, formic, oxalic, and succinic acids, the sodium salts of water insoluble acids, the sodium salts of water soluble non-volatile acids by the term "non-volatile acids" as used in this specification, I mean oxalic, succinic and other organic acids boiling above about 200° C., other than those mentioned above, sodium carbonate and possibly smaller amounts of other undetermined products. The exceedingly complex character of the above-described mixture is such that until the present time no satisfactory method has been available for the separation and recovery of the valuable products obtained by the alkaline fusion of cellulosic materials. I have now discovered a process of satisfactorily effecting this separation and recovery and shall proceed to described a preferred method of carrying out my new process. It is distinctly understood, however, that I do not confine myself to following exactly each and all of the steps set forth herein but may, if desired, suitably modify it in minor respects without leaving the concept of my invention which includes the general process herein set forth and naturally embodies the usual equivalents and modifications which would occur to one skilled in the art.

The salts of the volatile acids and the non-volatile acids other than oxalic make up about 40% by weight of the products obtained by the alkaline fusion of cellulosic materials, the remainder consisting of sodium oxalate and sodium carbonate in varying proportions. In carrying out my new process, the crude, pulverized melt is first extracted with an aqueous solution of a lower aliphatic alcohol and while I may satisfactorily employ methyl, ethyl, propyl and other alcohols for this purpose, I prefer, for economical reasons and ease of operation, to make use of a 75% by weight aqueous solution of methyl alcohol. By this treatment the sodium carbonate and sodium oxalate are left substantially undissolved and in excellent shape for further treatment. The solute from the above extraction, either before or after removal of the methyl alcohol by distillation, is treated with calcium acetate which causes the precipitation of the calcium salts of the water insoluble acids, of succinic acid, and possibly of other acids present in only small amounts. Approximately 90% of the salts remaining in solution after this step, consist of salts of the volatile acids.

In the place of the calcium acetate specified in this step of the operation, I may employ other materials such as other metal acetates or butyrates, i. e., lead, copper, barium, strontium, etc., acetates or butyrates, or I may even employ other salts of such metals. The use of materials of the latter character, however, leads to the introduction of other acid radicals into the solution being treated and consequently increases the difficulties encountered in later steps of the process. Calcium acetate is satisfactory both as a chemical reagent at this point of the process and is readily available economically, and I prefer its use for these reasons.

The methyl alcohol, if it has not previously been taken out, is next removed by distillation from the aqueous methyl alcohol solution containing a mixture of approximately 90% of volatile acid salts and 10% of other materials. A slight excess (5–10%) of crystalline oxalic acid is then added to the aqueous solution of salts and the sodium oxalate and calcium oxalate formed, removed. The resulting solution then contains principally acetic and formic acids, together with smaller amounts of oxalic, succinic and other higher acids. The volatile acids may be recovered from this solution by any of the customary methods such as extraction by means of solvents, distillation with liquids forming azeotropic mixtures with one or more of the constituents present, etc. I have found that a convenient method of recovering the volatile acids from the solution is by esterifying the acids with an alcohol such as ethyl, propyl, butyl, etc., and then recovering the esters by fractional distillation. For example, butyl alcohol together with a small amount of sulphuric acid, if needed, is added to the solution and esterification carried out in the usual manner. The butyl formate and butyl acetate thus formed may then be removed from the ester mixture by fractional distillation.

The sodium and calcium oxalate fractions recovered as above described may be treated by the customary methods for the recovery of the oxalic acid, if desired as such. One of the particular advantages of my new processes, however, is the fact that it permits of the recovery of the greater portion of the alkali used in the fusion of the cellulosic material and thereby greatly reduces the cost of preparing organic acids by this process. Accordingly, therefore, I prefer to proceed as follows:

The sodium oxalate—sodium carbonate cake remaining from the original methanol extraction is steamed to recover the methanol. It is next extracted with the aqueous washings from a previous batch at 35° C., the temperature of maximum solubility of sodium carbonate. The sodium oxalate is then filtered off and combined with that recovered, as described above, at other points in the process. This material is next boiled with sufficient lime to react with all of the sodium oxalate originally present. The sodium oxalate is converted by this means to calcium oxalate which is recovered by filtration, thus allowing the recovery of the alkali present. The calcium oxalate recovered at different points in the process is then treated with but 50% sulphuric acid for the recovery of oxalic acid.

The succinic acid, precipitated in the form of calcium succinate as above described with calcium acetate, may be recovered by the usual means.

*Example*

2365 grams of the melt obtained by the alkaline fusion of corncobs were extracted with approximately an equal weight of 75% aqueous methyl alcohol, the crushed melt being extracted with three portions of methanol since it was found that the first extraction left about 9% of volatile acid salts unextracted. The washed filter cake after the above three extractions weighed 1325 grams and it was found to contain about 2.7% of the volatile acids present in the original melt. In actual commercial practice it would possibly be advisable to effect at least the first extraction with the methyl alcohol used in a previous extraction so as to obtain as large a concentration of salts in the solvent as possible. The operating cycle showing this method of procedure, as well as later steps of the process, is shown in the accompanying flow sheet.

The methyl alcohol was then distilled off from the combined extraction liquors and the residues dried on the steam bath. The product thus obtained weighed 1038 grams and consisted of sodium formate, sodium acetate, sodium succinate, together with small amounts of other salts.

The succinic acid was next recovered as follows. The 1038 grams of salts, obtained as above described, were dissolved in water. 519 grams of calcium acetate were then separately dissolved in water, the total amount of the latter employed for solution of both salts being about 2540 grams. The solutions were then mixed, warmed and finally cooled. The mixture was seeded with calcium succinate for the purpose of accelerating the precipitation of the calcium succinate from the solution and the precipitate which formed over night removed from the solution by filtration. Analysis showed that the resulting solution contained not more than 5% of the succinic acid originally present. The precipitate consisted of calcium succinate, small amounts of the calcium salts of water insoluble acids, and possibly small amounts of the calcium salts of other acids.

The filtrate remaining from the above steps was found to contain approximately 1030 grams of soluble salts consisting principally of sodium acetate, sodium formate and a small amount of calcium acetate which was added in excess in the previous step. To this solution were then added 1000 grams of crystalline oxalic acid. After heating until all of the oxalic acid was in solution, the mixture was cooled and filtered. The precipitate consisting of sodium and calcium oxalates, was washed with several hundred cubic centimeters of water and saved for further treatment. To the filtrate and washing, 1200 grams of butyl alcohol were added and the water removed as a constituent of a boiling mixture with the butyl alcohol, the latter being constantly returned to the reaction vessel by an automtic separator. In order to accelerate the esterification, which progressed slowly towards the end of the operation, a few grams of sulphuric acid were then added and the heating continued until the reaction was completed. The product thus obtained consisted largely of a mixture of butyl acetate and butyl formate, together with smaller amounts of high-boiling esters such as butyl oxalate, butyl succinate, etc., and was separated into its constituents by fractional distillation. The total volatile acid recovery as esters amounted to 89% of that present in the crude melt. Additional material was recovered on reworking the residues obtained in the procedure above described.

The 1325 grams of sodium carbonate—sodium oxalate residue remaining from the methyl alcohol extraction step described above was boiled with 3 liters of water. After cooling, the sodium oxalate was filtered off and washed. The sodium carbonate thus recovered amounted to 390 grams.

The 930 grams of sodium oxalate remaining after the extraction of the sodium carbonate from the sodium carbonate—sodium oxalate cake, as described in the preceding step was added to the sodium oxalate recovered from the step in which the sodium salts were treated with oxalic acid to recover the free acids, and the whole then treated with calcium hydroxide for the purpose of recovering the sodium hydroxide which represents one of the large items of cost in preparing organic acids by the alkaline fusion of cellulosic materials.

In carrying out my process on a commercial scale it is naturally understood that certain modifications of the procedures outlined above are usually necessary in order to obtain the highest yields and the best general results. For example, it is usually necessary to extract the original material several times in order to recover as large a portion of the salts of the organic acids as possible. In carrying out such a process it is usually found desirable to use as the first extractant the filtrate from a previous extraction, such a procedure serving to reduce the volume of solvent which must later be recovered. A general outline of the procedure which I prefer to follow when operating on a commercial scale is shown in the accompanying diagram. In this diagram, or flow sheet of the process, the term non-volatile acids has been used in in the same sense as throughout the description, e. g. to represent oxalic, succinic, and other organic acids boiling above about 220° C. The formulæ RCOOH, and RCOOC₄H₉ to be found in the flow sheet under "recovery of acids" represent volatile organic acids higher in the aliphatic series than acetic, and their esters, respectively. This procedure naturally, however, may be varied considerably depending upon the character of the products desired and the equipment available. It is understood, therefore, that I desire to comprehend within the scope of my invention such modifications as may be necessary to adapt it to varying conditions and uses.

Now having described my invention what I desire to claim is:

1. Process for recovering products obtained by the alkaline fusion of cellulosic materials which comprises extracting said fusion product with an aqueous alcohol, removing the alcohol from the resulting solution, removing the non-volatile acids from said solution, and then converting the residual salts in said solution into the corresponding acids.

2. Process for recovering products obtained by the alkaline fusion of cellulosic materials which comprises extracting said fusion product with an alcohol-water mixture, removing the alcohol from the resulting solution, removing the non-volatile acids from said solution and then converting the residual salts in said solution into the corresponding acids.

3. Process for recovering products obtained by the alkaline fusion of cellulosic materials which comprises extracting said fusion product with an alcohol-water mixture, removing the alcohol from the resulting solution, precipitating and removing the non-volatile acids from said solution, then converting the residual salts in said solution into the corresponding acids, and finally separating and recovering the acids.

4. Process for recovering products obtained by the alkaline fusion of cellulosic materials which comprises extracting said fusion product with an aqueous methyl alcohol solution, removing the methyl alcohol from the resulting solution, removing the non-volatile acids from said solution, and finally converting the residual salts in said solution into the corresponding acids.

5. Process for recovering products obtained by the alkaline fusion of cellulosic materials which comprises extracting said fusion product with an aqueous alcoholic solution, removing the alcohol from the resulting solution, precipitating the non-volatile acids from said solution with a soluble salt of an alkaline earth metal, removing said products by filtration, and finally converting the residual salts in the filtrate into the corresponding acids.

6. Process for recovering products obtained by the alkaline fusion of cellulosic materials which comprises extracting said fusion product with an aqueous alcoholic solution, removing the alcohol from the resulting solution, precipitating the non-volatile acids from said solution with an acetate of an alkaline earth metal, removing said products by filtration, and finally converting the residual salts in the filtrate into the corresponding acids.

7. Process for recovering products obtained by the alkaline fusion of cellulosic material which comprises extracting said fusion product with an aqueous alcoholic solution, removing the alcohol from the resulting solution, precipitating the non-volatile acids from said solution with calcium acetate, removing said products by filtration, and finally converting the residual salts in the filtrate into the corresponding acids.

8. Process for recovering products obtained by the alkaline fusion of cellulosic materials which comprises extracting said fusion product with an aqueous alcoholic solution, removing the alcohol from the solution, precipitating the non-volatile acids from said solution with calcium acetate, removing said products, converting the residual salts in said solution into the corresponding acids, and finally esterifying the latter with an alcohol.

9. Process for recovering products obtained by the alkaline fusion of cellulosic materials which comprises extracting said fusion product with an aqueous alcoholic solution, removing the alcohol from the solution, precipitating the non-volatile acids from said solution with calcium acetate, removing said products, then converting the residual salts in said solution into the corresponding acids, esterifying the latter with an alcohol, and finally recovering the esters by fractional distillation.

10. Process for recovering products obtained by the alkaline fusion of cellulosic materials which comprises extracting said fusion product with an aqueous alcoholic solution, removing the alcohol from the resulting solution, precipitating and removing the non-volatile acids from said solution, and then converting the residual salts in said solution into the corresponding acids by treating with oxalic acid.

11. Process for recovering products obtained by the alkaline fusion of cellulosic materials which comprises extracting said fusion product with an aqueous alcoholic solution, removing the alcohol from the resulting solution, precipitating and removing the non-volatile acids from said solution, then converting the residual salts in said solution into the corresponding acids by treating with oxalic acid, and finally recovering the acids thus produced.

12. Process for recovering products obtained by the alkaline fusion of cellulosic materials which comprises extracting said fusion product with an aqueous alcoholic solution, removing the alcohol from the resulting solution, precipitating and removing the non-volatile acids from said solution, then converting the residual salts in said solution into the corresponding acids by treating with oxalic acid, esterifying the acids thus obtained with a suitable alcohol, and finally recovering the esters by fractional distillation.

13. Process for recovering acetic, formic, oxalic and succinic acids obtained by the alkaline fusion of cellulosic materials which comprises extracting said fusion products with an aqueous alcoholic solution, removing the alcohol from the resulting solution, removing the succinic acid from said solution in the form of a salt of said acid, then converting the sodium acetate and sodium formate in the resulting solution into the corresponding acids, esterifying the latter with a suitable alcohol, recovering the resulting ester by fractional distillation, and finally treating the residue from the original alcohol extraction for the recovery of oxalic acid.

14. Process for recovering acetic, formic, oxalic and succinic acids obtained by the alkaline fusion of cellulosic materials which comprises extracting said fusion products with an approximately 75% by weight aqueous methyl alcohol solution, removing the methyl alcohol by distillation from the filtrate thus obtained, removing the succinic acid from said filtrate by precipitating with calcium acetate, converting the sodium acetate and sodium formate in said filtrate into the corresponding acids by treating with oxalic acid, esterifying with butyl alcohol the formic and acetic acids thus produced, recovering the esters thus produced, and finally treating the residue from the original methyl alcohol extraction for the recovery of the oxalic acid.

In testimony whereof I affix my signature.

LLOYD C. SWALLEN.

CERTIFICATE OF CORRECTION.

Patent No. 1,869,948. August 2, 1932.

LLOYD C. SWALLEN.

It is hereby certified that error appears in the printed specification of the above numbered patent requiring correction as follows: Page 2, line 127, for the misspelled word "automtic" read automatic; page 3, line 55, for "220°" read 200°; and that the said Letters Patent should be read with these corrections therein that the same may conform to the record of the case in the Patent Office.

Signed and sealed this 29th day of November, A. D. 1932.

(Seal)

M. J. Moore,
Acting Commissioner of Patents.